(12) United States Patent
Li

(10) Patent No.: US 6,882,759 B1
(45) Date of Patent: Apr. 19, 2005

(54) FOUR-PORT PM CIRCULATOR

(75) Inventor: Wei-Zhong Li, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 77 days.

(21) Appl. No.: 10/163,217

(22) Filed: Jun. 4, 2002

(51) Int. Cl.[7] .................................................. G02B 6/00
(52) U.S. Cl. ............................ 385/11; 385/31; 359/483
(58) Field of Search ........................... 385/11, 15, 31, 385/39, 47, 33, 24; 359/483, 494, 495

(56) References Cited

U.S. PATENT DOCUMENTS

| | | | | |
|---|---|---|---|---|
| 5,930,039 A | * | 7/1999 | Li et al. ..................... | 359/484 |
| 6,014,475 A | * | 1/2000 | Frisken ...................... | 385/11 |
| 6,339,661 B1 | * | 1/2002 | Kokkelink et al. ........... | 385/11 |
| 6,445,499 B1 | * | 9/2002 | Chang et al. ................ | 359/484 |
| 6,587,267 B1 | * | 7/2003 | Tai et al. .................... | 359/484 |
| 6,590,706 B1 | * | 7/2003 | Xie et al. ................... | 359/495 |
| 6,636,651 B1 | * | 10/2003 | Li .............................. | 385/11 |

* cited by examiner

*Primary Examiner*—Rodney Bovernick
*Assistant Examiner*—Sung Pak
(74) *Attorney, Agent, or Firm*—Fish & Richardson P.C.

(57) ABSTRACT

A four-port circulator includes a first birefringent crystal, a structured polarization rotator, a first birefringent wedge, a second birefringent crystal, a non-reciprocal device, and a second birefringent wedge. The structured polarization rotator is coupled to the first birefringent crystal. The first birefringent wedge is coupled to the structured polarization rotator. The second birefringent crystal is coupled to the first birefringent wedge. The non-reciprocal device is coupled to the second birefringent crystal. The second birefringent wedge is coupled to the non-reciprocal device.

12 Claims, 5 Drawing Sheets

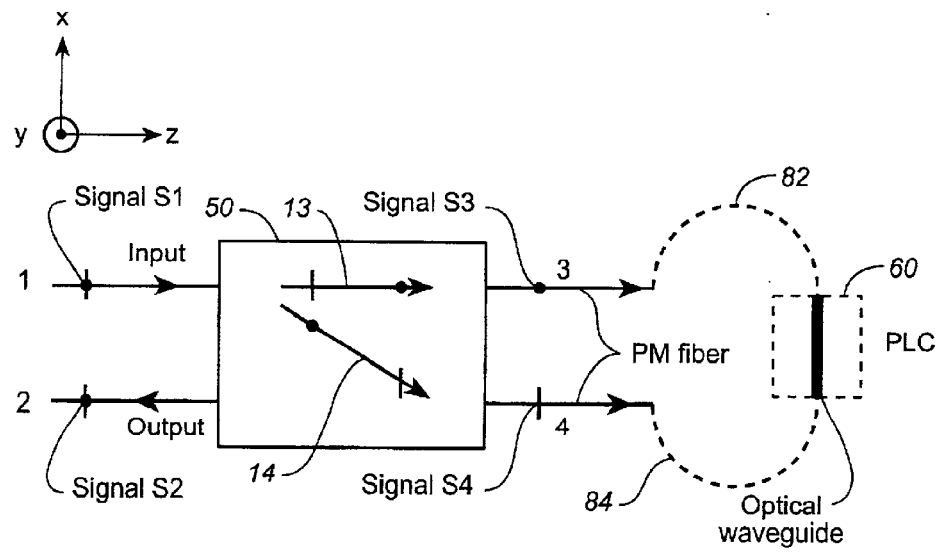
FIG._1a
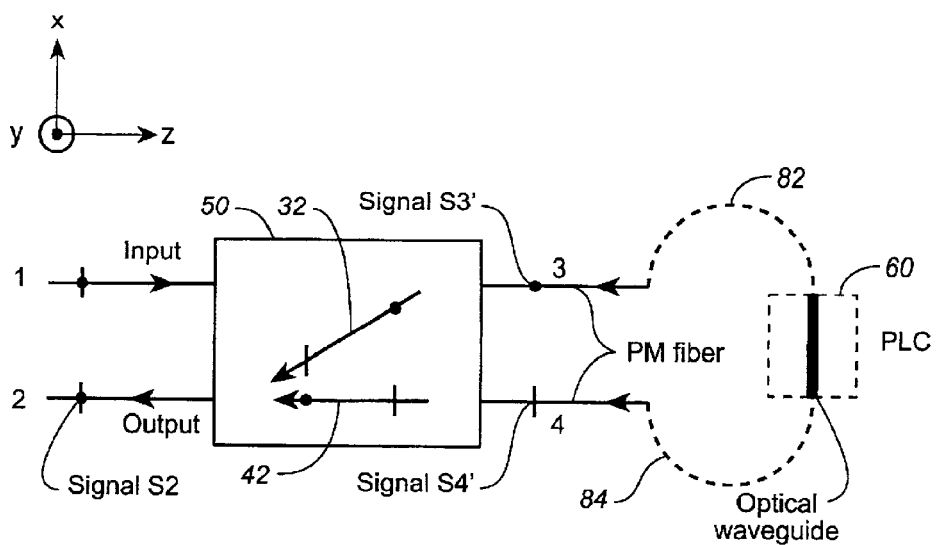
FIG._1b

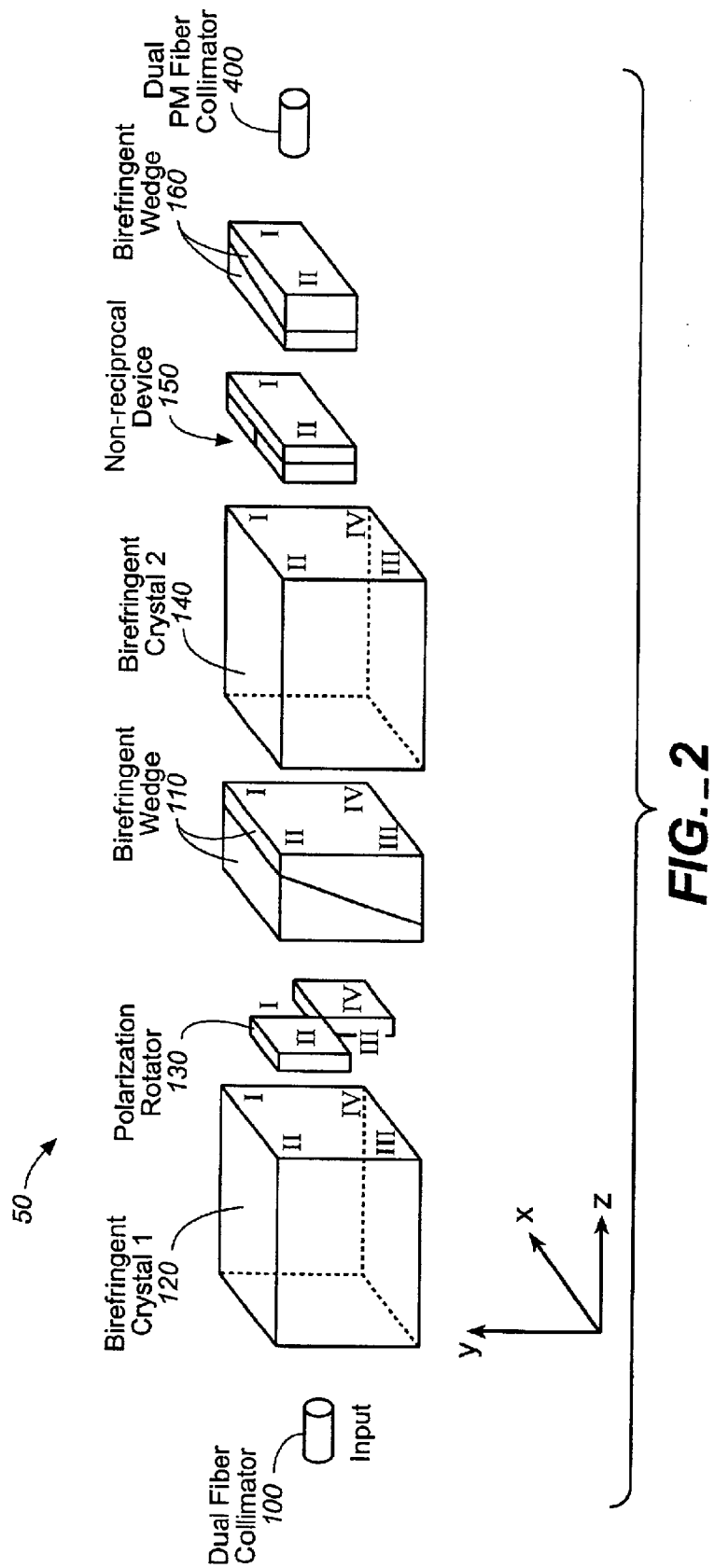
FIG._2

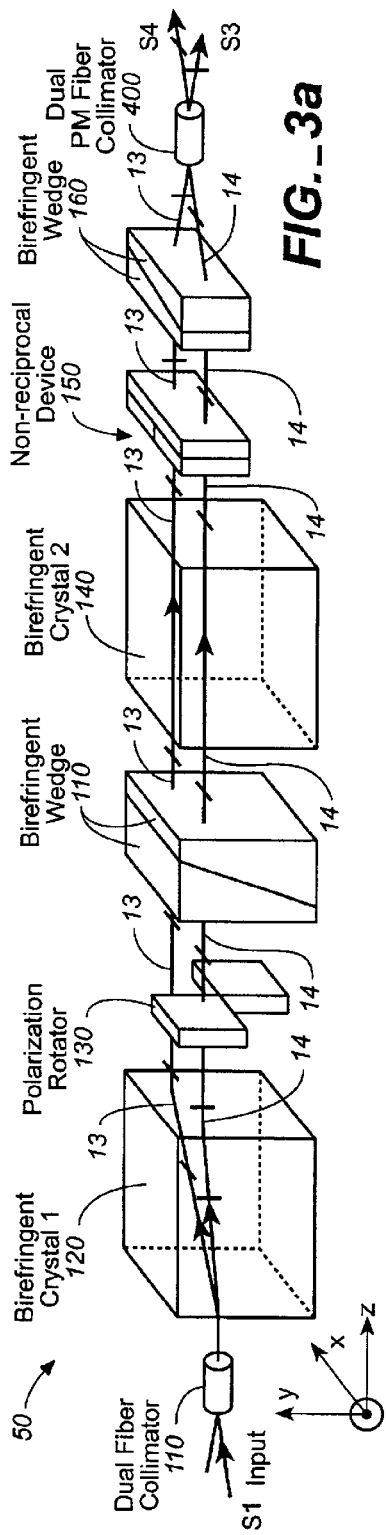
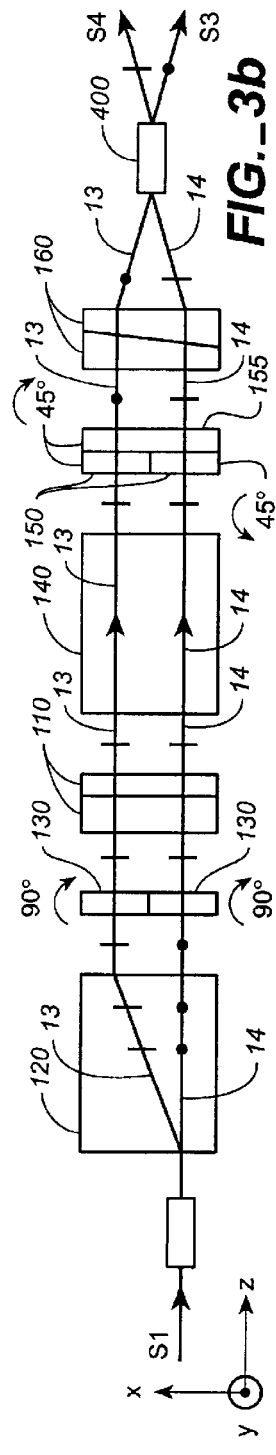
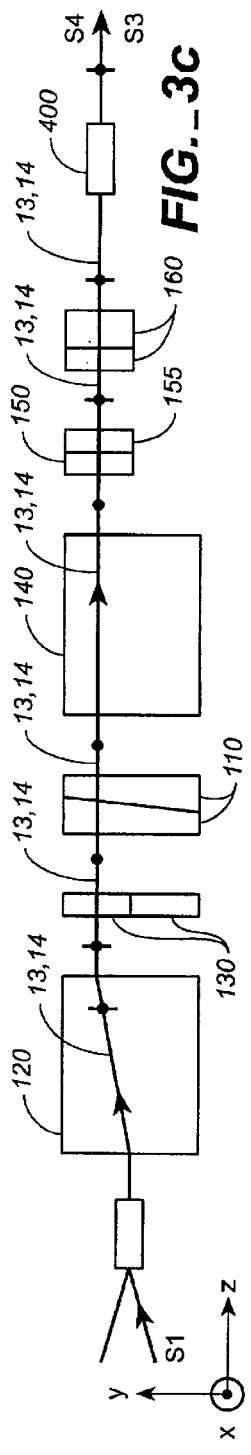
FIG._3a  FIG._3b  FIG._3c

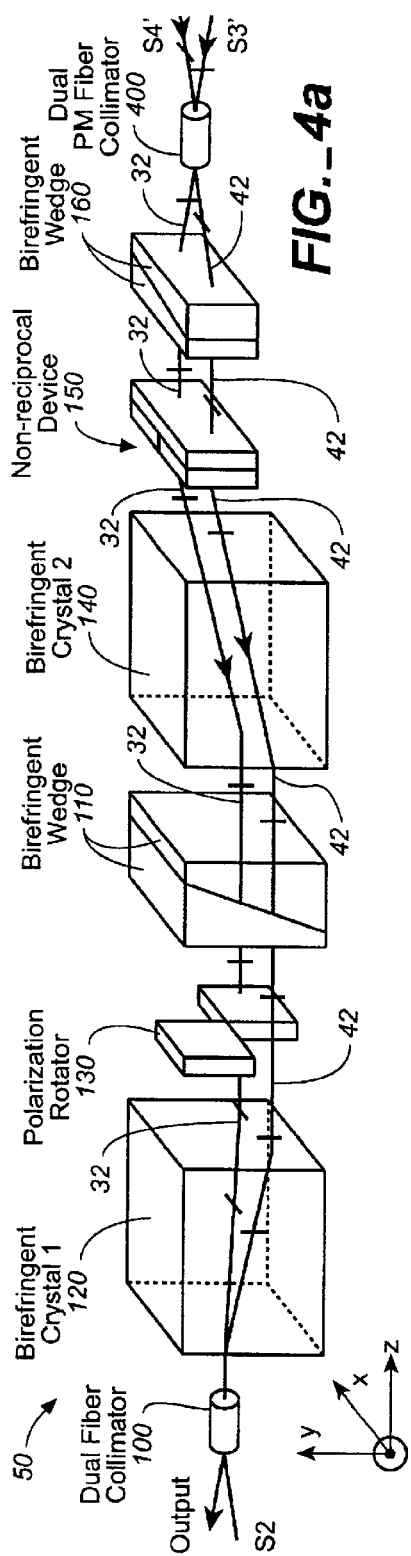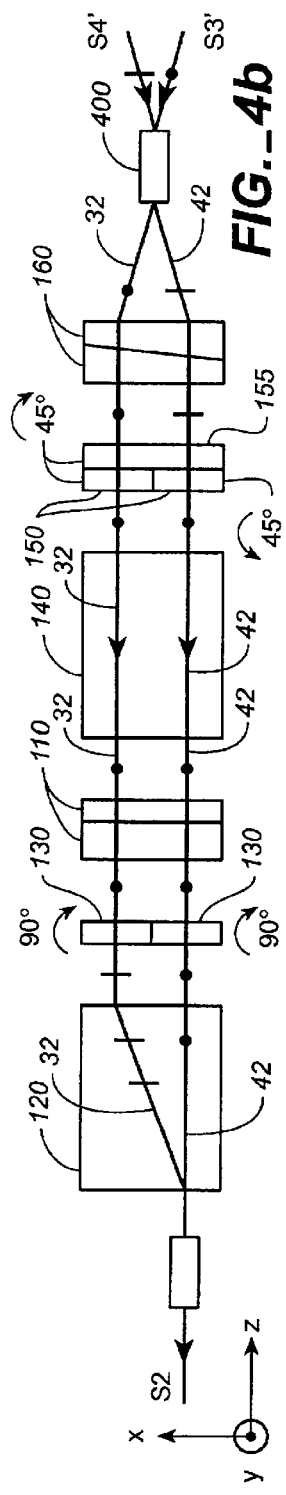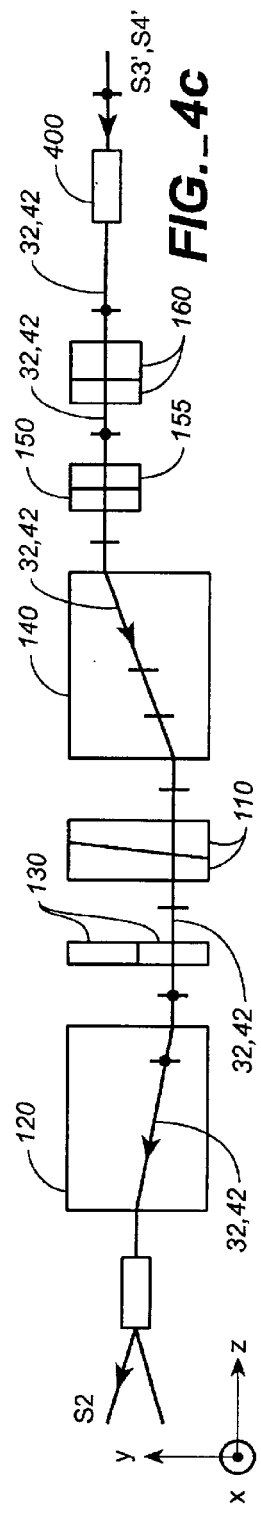
FIG._4a
FIG._4b
FIG._4c

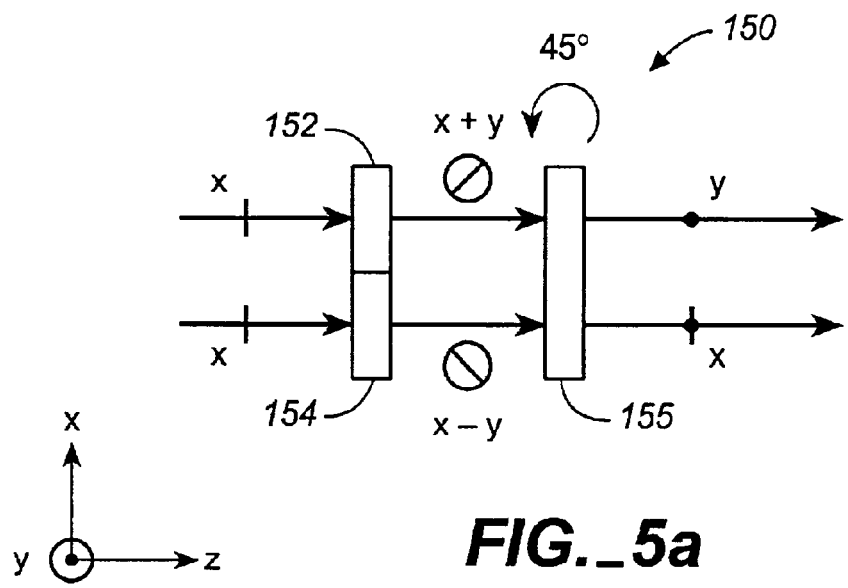
FIG._5a
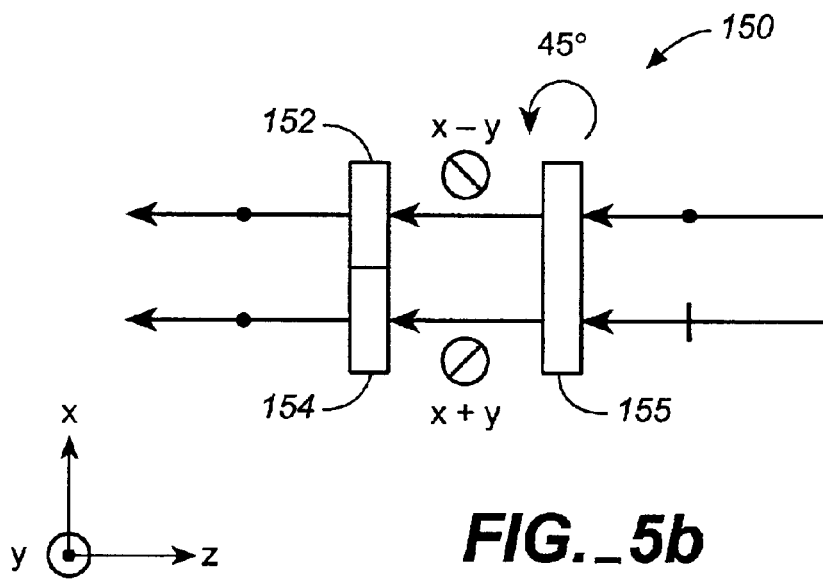
FIG._5b

FOUR-PORT PM CIRCULATOR

The present invention relates generally to optical technology.

BACKGROUND OF THE INVENTION

A circulator is often used with other optical devices to achieve certain optical functions. For example, a circulator can be used with a Brag Grating to extract an optical signal with a particular wavelength from a WMD optical signal. When an optical device such as a Brag Grating is manufactured using Planar Lightwave Circuit ("PLC") or optical waveguide technologies, the optical device can become polarization sensitive. One method of using a PLC as a polarization insensitive device is to combine the PLC with a Polarization Maintenance ("PM") circulator. FIGS. 1a and 1b illustrate a four-port PM circulator 50 coupled to a PLC 60 through two PM fibers 82 and 84.

As shown in FIG. 1a, a randomly polarized signal S1 received at port 1 of PM circulator 50 is separated into light beam 13 with the x-polarization and light beam 14 with the y-polarization. Light beam 13 exits from port 3 of PM circulator 50 and becomes signal S3 with the y-polarization. Light beam 14 exits from port 4 of PM circulator 50 and becomes signal S4 with the x-polarization. Signal S3 is transmitted into PLC 60 through PM fiber 82. Signal S4 is transmitted into PLC 60 through PM fiber 84.

As shown in FIG. 1b, optical signal S3' with the y-polarization, received from PLC 60 through PM fiber 82, enters port 3 of PM circulator 50 as light beam 32. Optical signal S4' with the x-polarization, received from PLC 60 through PM fiber 84, enters port 4 of PM circulator 50 as light beam 42. Light beam 32 exits from port 2 of PM circulator 50 as a first component of signal S2 with the x-polarization. Light beam 42 exits from port 2 of PM circulator 50 as a second component of signal S2 with the y-polarization.

SUMMARY OF THE INVENTION

In one aspect the invention provides a four-port circulator. The four-port circulator includes a first birefringent crystal, a structured polarization rotator, a first birefringent wedge, a second birefringent crystal, a non-reciprocal device, and a second birefringent wedge. The structured polarization rotator is coupled to the first birefringent crystal. The first birefringent wedge is coupled to the structured polarization rotator. The second birefringent crystal is coupled to the first birefringent wedge. The non-reciprocal device is coupled to the second birefringent crystal. The second birefringent wedge is coupled to the non-reciprocal device.

In another aspect, the invention provides a method for transmitting light among a first port, a second port, a third port, and a fourth port. The light has either a first polarization or a second polarization. The method includes the step of sending a randomly polarized light from the first port onto a first birefringent crystal. The method includes the step of separating the randomly polarized light into a first forward light with a first polarization and a second forward light with a second polarization. The method includes the step of changing the polarization of the first forward light from the first polarization to the second polarization. The method includes the step of passing the first and the second forward light through a first birefringent wedge and a second birefringent crystal. The method includes the step of changing the polarization of the second forward light from the second polarization to the first polarization. The method includes the step of deflecting the first forward light with a second birefringent wedge. The method includes the step of passing the second forward light through the second birefringent wedge. The method includes the step of directing the first forward light into the fourth port. The method includes the step of directing the second forward light into the third port.

Aspects of the invention can include one or more of the following advantages. Implementations of the invention provide a four-port PM circulator that may use two collimators to circulate light signals among four ports. Other advantages will be readily apparent from the attached figures and the description below.

BRIEF DESCRIPTION OF THE DRAWINGS

FIGS. 1a and 1b illustrate a four-port PM circulator coupled to a Planar Lightwave Circuit through PM fibers.

FIG. 2 illustrates the position and orientation of components of a four-port PM circulator.

FIGS. 3a–3c illustrate a path traversed by a randomly polarized signal S1 introduced at dual fiber collimator 100 of the four-port PM circulator of FIG. 2.

FIGS. 4a–4c illustrate paths traversed by optical signals S3' and S4' introduced at dual PM fiber collimator 400 of the four-port PM circulator of FIG. 2.

FIGS. 5a and 5b illustrate one implementation of non-reciprocal device 150.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of a four-port PM circulator having specific components having a specific configuration. Similarly, the present invention will be described in terms of four-port PM circulator components having specific relationships, such as distances or angles between components. However, one of ordinary skill in the art will readily recognize that this method and system will operate effectively for other components having similar properties, other configurations, and other relationships between components.

FIG. 2 illustrates an implementation of four PM circulator 50. Circulator 50 includes dual fiber collimator 100, birefringent crystal 120, structured polarization rotator 130, birefringent wedge 10, birefringent crystal 140, non-reciprocal device 150, birefringent wedge 160, and dual PM fiber collimator 400.

A light beam may enter one of four regions of a given component in four ports PM circulator 50. The four regions are labeled as quadrant I, II, III, IV, as shown in FIG. 2. The x-direction, y-direction and the z-direction are also shown in the figure. The positive z-direction is along the propagation direction of a light beam introduced at dual fiber collimator 100.

FIGS. 3a–3c illustrate that random polarized signal S1 introduced at dual fiber collimator 100 is separated into light beams 13 and 14; light beams 13 and 14 become signals S3 and S4 respectively. FIG. 3a is a perspective view, FIG. 3b is a planar view on the x-z plane, and FIG. 3c is a planar view on the y-z plane.

More specifically, random polarized signal S1 introduced at dual fiber collimator 100 is separated into light beam 13 with the x-polarization and light beam 14 with the y-polarization. Both light beam 13 and light beam 14 enter quadrant II of birefringent material 120. Light beam 13 is deflected and exits from quadrant I of birefringent material 120. Light beam 14 is not deflected and exits from quadrant II of birefringent material 120.

Light beam 13 passes through quadrant I of structured polarization rotator 130, quadrant I of birefringent wedge 110, and quadrant I of birefringent material 140. Light beam 13 then enters quadrant I of non-reciprocal device 150 with the x-polarization, exits from quadrant I of non-reciprocal device 150 with the y-polarization, passes through quadrant I of birefringent wedge 160 with the y-polarization, and enters dual PM fiber collimator 400. The light signal exiting dual PM fiber collimator 400 with the y-polarization becomes signal S3. When traveling from dual fiber collimator 100 to dual PM fiber collimator 400, light beam 13, having the x-polarization, is not deflected by birefringent wedge 110, birefringent material 140, or birefringent wedge 160.

Light beam 14 enters quadrant II of structured polarization rotator 130 with the y-polarization, exits from structured polarization rotator 130 with the x-polarization, and passes through quadrant II of birefringent wedge 110 and through quadrant II of birefringent material 140. Light beam 14 then enters quadrant II of non-reciprocal device 150 with the x-polarization, exits from quadrant II of non-reciprocal device 150 with the x-polarization, and enters quadrant II of birefringent wedge 160. Thereafter, light beam 14 is deflected by birefringent wedge 160 and enters dual PM fiber collimator 400 with the x-polarization. The light signal exiting dual PM fiber collimator 400 with the x-polarization becomes signal S4. When traveling from dual fiber collimator 100 to dual PM fiber collimator 400, light beam 14 is not deflected by birefringent wedge 110 and birefringent material 140.

FIGS. 4a–4c illustrate that optical signals S3' and S4' are introduced at dual PM fiber collimator 400 as light beams 32 and 42 respectively; beams 32 and 42 exit from dual fiber collimator 100 respectively as first and second components of signal S2. FIG. 4a is a perspective view, FIG. 4b is a planar view on the x-z plane, and FIG. 4c is a planar view on the y-z plane.

As shown in FIGS. 4a–4c, optical signal S3' is introduced at dual PM fiber collimator 400 as light beam 32 with the y-polarization. Light beam 32 passes through quadrant I of birefringent wedge 160, without being deflected, enters quadrant I of non-reciprocal device 150 with the y-polarization, and exits from quadrant I of non-reciprocal device 150 with the y-polarization. Light beam 32 then enters quadrant I of birefringent crystal 140, is deflected in the negative y-direction, and exits from quadrant IV of birefringent crystal 140. Thereafter, light beam 32 passes through quadrant IV of birefringent wedge 110, deflected by the wedge in the positive z-direction, enters quadrant IV of structured polarization rotator 130 with the y-polarization, exits from quadrant IV of structured polarization rotator 130 with the x-polarization, and enters quadrant IV of birefringent crystal 120. Finally, light beam 32, is deflected by birefringent crystal 120 in the negative x-direction, exits from quadrant II of birefringent crystal 120, and enters dual fiber collimator 100. The light exits from dual fiber collimator 100 as a first component of optical signal S2 with the x-polarization.

As shown in FIGS. 4a–4c, optical signal S4' is introduced at dual PM fiber collimator 400 as light beam 42 with the x-polarization. Light beam 42 enters quadrant II of birefringent wedge 160, is deflected in the positive x-direction, and exits from quadrant II of birefringent wedge 160 essentially in alignment with the negative z-direction. Light beam 42 enters quadrant II of non-reciprocal device 150 with the x-polarization, and exits quadrant II of non-reciprocal device 150 with the y-polarization. Light beam 42 then enters quadrant II of birefringent crystal 140, is deflected in the negative y-direction, and exits from quadrant III of birefringent crystal 140. Thereafter, light beam 42 passes through quadrant III of birefringent wedge 10, is deflected in the positive y-direction, enters quadrant III of structured polarization rotator 130 with the y-polarization, exits from quadrant III of structured polarization rotator 130 with the y-polarization, and enters quadrant III of birefringent crystal 120. Finally, light beam 32, without deflected by birefringent crystal 120, exits from quadrant II of birefringent crystal 120, and enters dual fiber collimator 100. The light exits from dual fiber collimator 100 as second component of optical signal S2 with the y-polarization.

As described above, the functions of each component in circulator 50 may depend on both the direction and the quadrant that a light beam enters. The construction of each component in four-port PM circulator 50 is described below. The functions of each component, when light travels in the positive z-direction, are described with respect to FIGS. 3a–3c. Likewise, the functions of each component, when light travels in the negative z-direction, are described with respect to FIGS. 4a–4c.

Birefringent material 120 is constructed and orientated in such a way to perform following functions: (1) light passing through birefringent material 120 in the positive z-direction with the y-polarization will not be deflected, and light with the x-polarization will be deflected in the positive x-direction; (2) light passing through birefringent material 120 in the negative z-direction with the y-polarization will not be deflected, and light with the x-polarization will be deflected in the negative x-direction. Accordingly, birefringent material 120 splits or joins light beams in accordance with their respective polarizations. The polarization of the O-ray in birefringent material 120 is in the y-direction.

Structured polarization rotator 130 is constructed in such a way to perform following functions: when traveling in either the positive or negative z-directions, light passing through quadrants II or IV of structured polarization rotator 130 will have the polarization thereof rotated by 90 degrees, and light passing through quadrants I or III will keep the polarization thereof unchanged.

In one implementation, structured polarization rotator 130 includes two half wave plates respectively located at quadrants II and IV. Each of the half wave plate has an optical axis that has an angle of 45 degrees relative to the x-axis or the y-axis.

Birefringent wedge 110 is constructed and orientated in such a way to perform following functions: (1) light passing through birefringent wedge 110 in the positive z-direction with the x-polarization will not be deflected; (2) light passing through birefringent wedge 110 in the negative z-direction with the y-polarization will be deflected in the positive y-direction. The polarization of the o-ray in birefringent material wedge 110 is in the x-direction.

Birefringent material 140 is constructed and orientated in such a way to perform following functions: (1) light passing through birefringent material 140 in the positive z-direction with the x-polarization will not be deflected; (2) light passing through birefringent material 140 in the negative z-direction with the y-polarization will be deflected in the negative y-direction. The polarization of the O-ray in birefringent material 140 is in the x-direction.

Non-reciprocal device 150 is constructed to perform following functions: (1) light entering quadrant I of non-reciprocal device 150 in the positive z-direction with the x-polarization will exits from non-reciprocal device 150 with the y-polarization, and light entering through quadrant II of non-reciprocal device 150 with the x-polarization will exits from non-reciprocal device 150 with the x-polarization; (2) light entering quadrant I of non-reciprocal device 150 in the negative z-direction with the y-polarization will exits from non-reciprocal device 150 with the y-polarization, and light entering quadrant II of non-reciprocal device 150 with the x-polarization will exits from non-reciprocal device 150 with the y-polarization.

One implementation of non-reciprocal device 150, as shown in FIGS. 5*a* and 5*b*, includes two half wave plates 152 and 154, respectively, located at quadrants I and II, and includes Faraday rotator 155 covering both quadrants I and II. The polarization of a light beam passing through Faraday rotator 155 in either the positive or the negative z-directions will be rotated +45 degrees with respect to the positive z-axis.

The polarization of a light beam passing through half wave plate 152 in the positive z-direction with the x-polarization will become the x+y polarization. The polarization of a light beam passing through half wave plates 154 in the positive z-direction with the x-polarization will become the x-y polarization. The polarization of a light beam passing through half wave plate 152 in the negative z-direction with the x−y polarization will become the y-polarization. The polarization of a light beam passing through half wave plate 154 in the negative z-direction with the x+y polarization will become the y-polarization. When the position of Faraday rotator 155 is exchanged with the positions of half wave plates 152 and 154, the functions of non-reciprocal device 150 do not change.

Birefringent wedge 160 is constructed and orientated in such a way to perform following functions: (1) light passing through birefringent wedge 160 in the positive z-direction with the y-polarization will not be deflected; (2) light passing through birefringent wedge 160 in the to negative z-direction with the x-polarization will be deflected in the positive x-direction. The polarization of the o-ray in birefringent wedge 160 is in the y-direction.

A method and system has been disclosed for providing a four-port PM circulator, which may have low cost to manufacture. Although the present invention has been described in accordance with the embodiments shown, one of ordinary skill in the art will readily recognize that there could be variations to the embodiments described and those variations would be within the spirit and scope of the present invention. Accordingly, many modifications may be made by one of ordinary skill in the art without departing from the spirit and scope of the appended claims.

What is claimed is:

1. A four-port circulator comprising:
   a first birefringent crystal;
   a structured polarization rotator coupled to the first birefringent crystal;
   a first birefringent wedge coupled to the structured polarization rotator, the first birefringent wedge having a first orientation;
   a second birefringent crystal coupled to the first birefringent wedge;
   a non-reciprocal device coupled to the second birefringent crystal; and
   a second birefringent wedge coupled to the non-reciprocal device, the second birefringent wedge having a second orientation different from the first orientation.

2. The four-port circulator of claim 1, further comprising:
   a dual fiber collimator coupled to first birefringent crystal, the dual fiber collimator adapted to be coupled to a first fiber and a second fiber;
   a dual fiber collimator coupled to the second birefringent wedge, the dual PM fiber collimator adapted to be coupled to a first PM fiber and a second PM fiber.

3. The four-port circulator of claim 1, wherein the structured polarization rotator includes two regions of half wavelength plates placed diagonal to each other.

4. The four-port circulator of claim 1, wherein the non-reciprocal device includes two regions each having a half wave plate coupled to a Faraday rotator.

5. The four-port circulator of claim 1, wherein a polarization of an o-ray in the first birefringent crystal is substantially orthogonal to the polarization of the o-ray in the second birefringent crystal.

6. The four-port circulator of claim 1, wherein a polarization of an o-ray in the first birefringent wedge is substantially orthogonal to the polarization of the o-ray in the second birefringent wedge.

7. A method for transmitting light among a first port a second port, a third port, and a fourth port, the method comprising:
   receiving a randomly polarized light from the first port;
   separating the randomly polarized light into a first forward light with a fist polarization and a second forward light with a second polarization;
   deflecting the first forward light and the second forward light into an upper optical path;
   changing the polarization of the first forward light from the first polarization to the second polarization;
   passing the first and the second forward light through a first birefringent wedge and a second birefringent crystal;
   changing the polarization of the second forward light from the second polarization to the first polarization;
   deflecting the first and second forward light in a same plane as the upper optical path and directing the first forward light into the fourth port; and
   directing the second forward light into the third port.

8. A method of claim 7, further comprising
   receiving a first backward light from the fourth port with the second polarization;
   deflecting the first back light in a same plane as the upper optical path;
   changing the polarization of the first backward light from the second polarization to the first polarization;
   deflecting the first backward light from the upper optical path into a lower optical path;
   deflecting the first backward light from the lower optical path to a middle optical path; and
   directing the first backward light into the second port with the first polarization.

9. A method of claim 8, further comprising receiving a second backward light from the third port with the first polarization;

deflecting the second backward light in a plane of the upper optical path and substantially parallel to the first backward light;

deflecting the second backward light from the upper optical path to a lower optical path;

changing the polarization of the second backward light from the first polarization to the second polarization;

deflecting the second backward light from a lower optical path to an upper optical path while deflecting the second backward light so as to be combined with the first backward light; and directing the second backward light into the second port with the second polarization.

10. The four-port circulator of claim 1 wherein a randomly polarized light received from the first port is incident on the first birefringent crystal;

the first birefringent crystal is adapted to separate the randomly polarized light into a first forward light with a first polarization and a second forward light with a second polarization;

the structured polarization rotator is adapted to change the polarization of the first forward light received from the first birefringent crystal from the first polarization to the second polarization;

the first and the second forward light pass through the first birefringent wedge and a second birefringent crystal without change;

the non-reciprocal device is adapted to change the polarization of the second forward light received from the second birefringent crystal from the second polarization to the first polarization; and the second birefringent wedge is adapted to deflect the first forward light and direct the first forward light into the fourth port and direct the second forward light into the third port.

11. The four port circulator of claim 10, wherein the second birefringent wedge is adapted to receive and deflect a fist backward light from the fourth port with the second polarization;

the non-reciprocal device is adapted to change the polarization of the fist backward light received from the second birefringent wedge from the second polarization to the first polarization;

the second birefringent crystal is adapted to deflect the first backward light received from the non-reciprocal device;

the fist birefringent wedge is adapted to deflect the first backward light received from the second birefringent crystal; and the first birefringent crystal is adapted to pass the first backward light and directing the first backward light into the second port with the first polarization.

12. The four port circulator of claim 11, further comprising the second birefringent wedge is adapted to receive a second backward light from the third port with the first polarization and deflect the second backward light to be substantially parallel to the first backward light;

the second birefringent crystal adapted to deflect the second backward light into a lower optical path;

the first birefringent wedge operable to pass the first and the second backward light;

the structured polarization rotator adapted to change the polarization of the first backward light from the first polarization to the second polarization; and the first birefringent crystal adapted to deflect the second backward light and direct the second backward light into the second port with the second polarization.

* * * * *